United States Patent
Huang

[19]

[11] Patent Number: 5,862,593
[45] Date of Patent: Jan. 26, 1999

[54] PIPE CUTTER HAVING A CONFIGURATION FOR EASILY REPLACING CUTTER BLADE

[76] Inventor: Chi-Chieh Huang, No. 9, Alley 38, Lane 301, Nan Yang Road, Feng Yuan City, Taichung Hsien, Taiwan

[21] Appl. No.: 899,767

[22] Filed: Jul. 24, 1997

[51] Int. Cl.[6] .................................................. B23D 21/06
[52] U.S. Cl. .................................................. 30/92; 30/182
[58] Field of Search ................................ 30/92, 180, 182, 30/241

[56] References Cited

U.S. PATENT DOCUMENTS

| | | | |
|---|---|---|---|
| 3,992,777 | 11/1976 | Perkins et al. | 30/182 |
| 5,018,275 | 5/1991 | Huang | 30/92 |
| 5,046,250 | 9/1991 | Huang | 30/92 |
| 5,070,616 | 12/1991 | Chen | 30/92 |
| 5,218,765 | 6/1993 | Huang | 30/92 |

*Primary Examiner*—Hwei-Siu Payer
*Attorney, Agent, or Firm*—Charles E. Baxley, Esq.

[57] ABSTRACT

A pipe cutter includes a slide slideably engaged in a housing and a cutting blade secured to the slide. A hand grip may move the cutting blade forward gradually for cutting a pipe. The housing includes one or more openings for engaging with one or more fasteners and for allowing the fasteners to be engaged into the housing and to secure the cutting blade to the slide without disassembling the whole housing. A retaining plate may be secured to the slide and engaged with the cutting blade for securing the cutting blade in place. A panel includes one or more screw holes for engaging with the fastener and for allowing the fastener to further secure the cutting blade and the slide together.

5 Claims, 4 Drawing Sheets

PIPE CUTTER HAVING A CONFIGURATION FOR EASILY REPLACING CUTTER BLADE

BACKGROUND OF THE INVENTION

1. Field of the Invention

The present invention relates to a pipe cutter, and more particularly to a pipe cutter having a specially designed configuration for allowing the cutting blade to be easily replaced.

2. Description of the Prior Art

Typical pipe cutters comprises a body and a cutting blade slidably engaged in the body. A hand grip may be actuated in a reciprocating action for moving the cutting blade toward a fixed jaw and for conducting pipe cutting operations. However, when it is required to replace the cutting blade, the whole pipe cutter should be completely disassembled for changing the cutting blade. It is inconvenient and it may take a long time to replace the cutting blade.

The present invention has arisen to mitigate and/or obviate the afore-described disadvantages of the conventional pipe cutters.

SUMMARY OF THE INVENTION

The primary objective of the preset invention is to provide a pipe cutter which includes a specially designed configuration for allowing the cutting blade to be easily replaced.

In accordance with one aspect of the invention, there is provided a pipe cutter comprising a housing including a rear portion having a handle extended downward, and including a front portion having a fixed jaw, the housing including at least one opening, a hand grip including an upper portion pivotally coupled to the housing at a pivot shaft, a slide slidably engaged in the housing and adapted to be moved forward and rearward, a cutting blade for securing to the slide and for being moved in concert with the slide, an actuating means coupled between the slide and the hand grip for allowing the hand grip to move the slide and the cutting blade forward toward the fixed jaw, and at least one fastener adapted to be engaged into the housing via the opening for allowing the fastener to secure the cutting blade and the slide together without disassembling the housing.

The slide includes a front portion, the cutting blade includes a rear portion for engaging with the front portion of the slide, the slide further includes a retaining plate for engaging with the cutting blade and for retaining the cutting blade in place. The front portion of the slide includes a recess for receiving the rear portion of the cutting blade. The slide includes a dovetail slot formed in the front portion, the retaining plate includes a dovetail for engaging with the dovetail slot and for securing the retaining plate to the slide.

The rear portion of the cutting blade includes at least one aperture for engaging with the fastener, the front portion of the slide includes at least one orifice for engaging with the fastener, the retaining plate includes at least one puncture for engaging with the fastener and for allowing the fastener to secure the retaining plate and the cutting blade and the slide together.

The slide includes a depression formed in the front side portion and includes a panel engaged in the depression, the panel includes at least one hole for engaging with the fastener.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
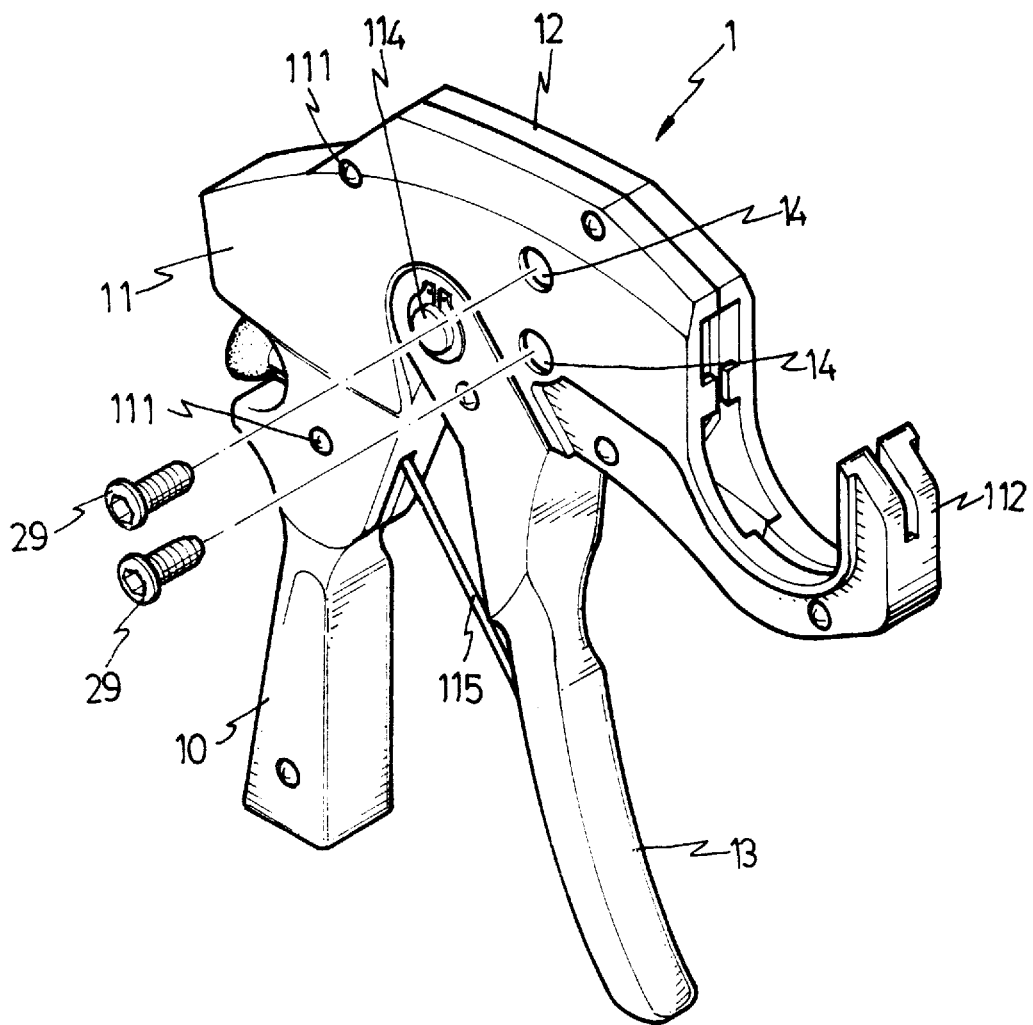
FIG. 1 is a perspective view of a pipe cutter in accordance with the present invention.

Referring to the drawings, and initially to FIG. 1, a pipe cutter in accordance with the present invention comprises a housing 1 including two half members 11, 12 secured together by fasteners 111. The housing 1 includes a handle 10 extended downward from the rear portion and includes a fixed jaw 112 provided on the front portion for holding a pipe to be cut. A hand grip 13 includes an upper portion pivotally coupled to the housing 1 at a pivot shaft 114 for allowing the hand grip 13 to be moved toward and away from the handle 10 with a reciprocating action. A spring 115 is engaged with the hand grip 13 for biasing the hand grip 13 away from the handle 10. The housing 1 includes one or more openings 14 for engaging one or more fasteners 29 into the housing 1. The function of the fasteners 29 will be discussed hereinafter.

Figure 2:
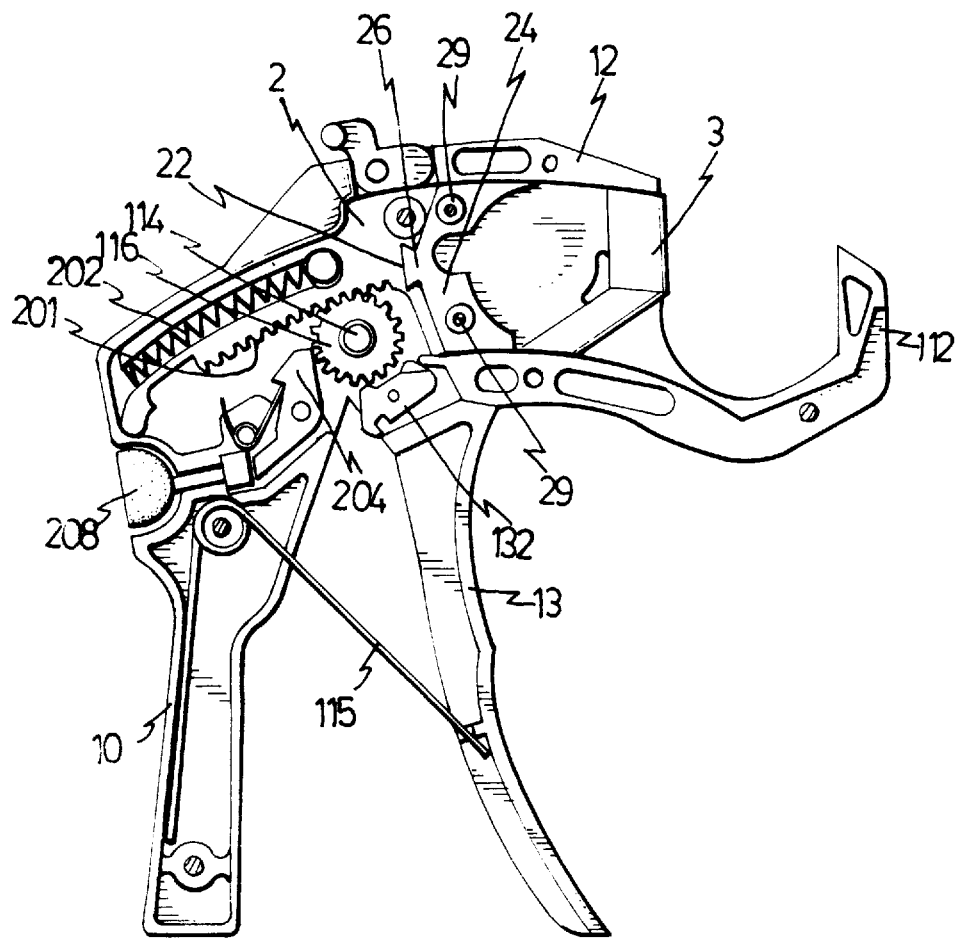
FIG. 2 is a plane view of the pipe cutter, in which one half of the housing has been removed for showing the interior configuration of the pipe cutter.
Figure 3:
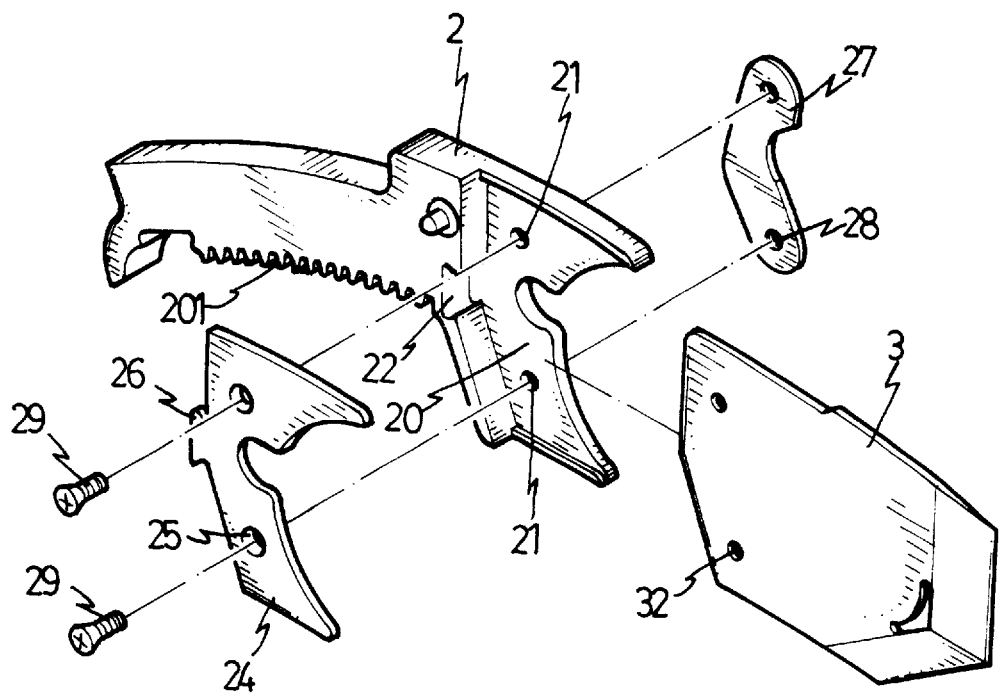
FIG. 3 is a partial exploded view of a cutter mechanism seeing from one side portion of the cutter mechanism.
Figure 4:
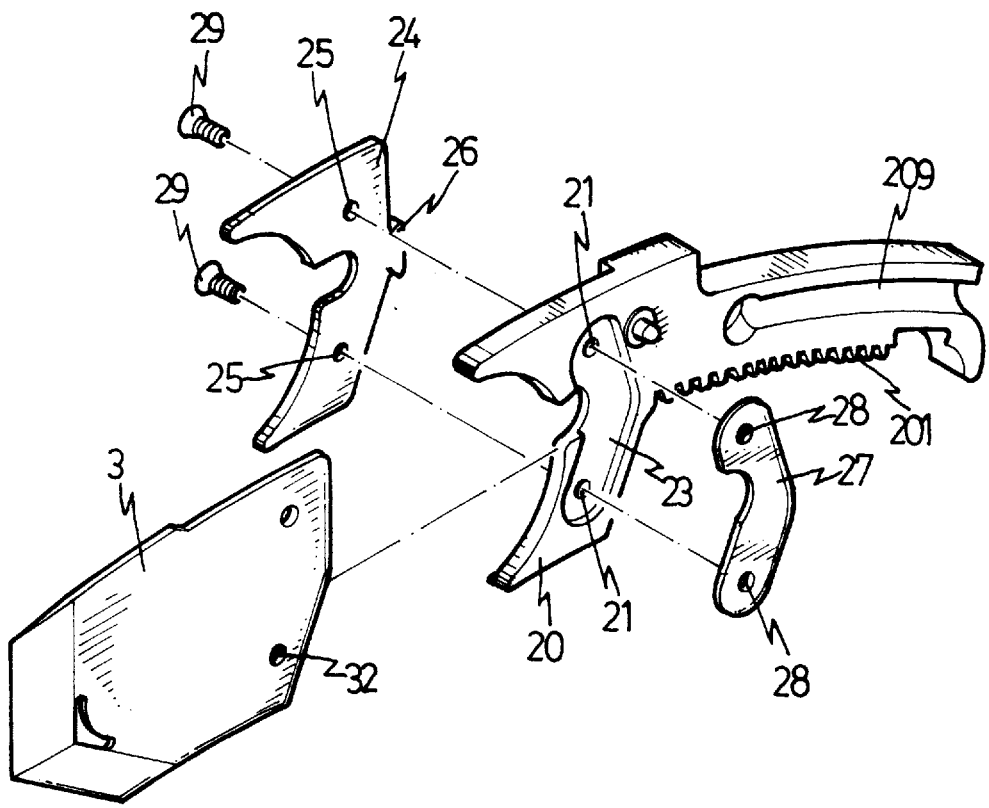
FIG. 4 is a partial exploded view of the cutter mechanism seeing from the other side portion of the cutter mechanism.

As shown in FIGS. 2 and 3, a gear 116 is rotatably engaged on the pivot shaft 114. The hand grip 13 includes a pawl 132 for engaging with the gear 116 and for rotating the gear 116 gradually or step by step when the hand grip 13 is moved toward and away from the handle 10 by the reciprocating action. A slide 2 is slidably engaged in the housing 1 and adapted to be moved forward and rearward in the housing 1. The slide 2 includes a rack 201 for engaging with the gear 116 and for allowing the slide 2 to be moved forward by the gear 116 when the gear 116 is rotated clockwise (FIG. 2) by the hand grip 13. A spring 202 is engaged between the slide 2 and the housing 1 for pulling the slide 2 rearward of the housing 1. As shown in FIG. 4, the slide 2 includes a groove 209 for receiving the spring 202. A spring-biased stop 204 is secured in the housing 1 and is biased to engage with the gear 116 for preventing the gear 116 from rotating counterclockwise and for preventing the slide 2 from moving rearward. A knob 208 is provided in the rear portion of the housing 1 for disengaging the stop 204 from the gear 116 when the knob 208 is depressed inward of the housing 1. The slide 2 may thus be pulled rearward by the spring 202 when the stop 204 is disengaged from the gear 116.

The slide 2 includes a recess 20 formed in one slide of the front portion for engaging with the rear portion of a cutting blade 3. The cutting blade 3 includes one or more apertures 32 formed in the rear portion. The slide 2 includes one or more orifices 21 formed in the front portion for aligning with the apertures 32 of the cutting blade 3 and includes a dovetail slot 22 communicating with the recess 20. A retaining plate 24 is engaged with the rear portion of the cutting blade 3 and includes a dovetail 26 for engaging with the dovetail slot 22 and for solidly securing the retaining plate 24 to the slide 2. The retaining plate 24 includes one or more punctures 25 for aligning with the apertures 32 of the cutting blade 3 and for aligning with the orifices 21 of the slide 2 and for engaging with the fasteners 29 which may secure the cutting blade 3 to the slide 2. The retaining plate 24 may be used for solidly securing the cutting blade 3 to the slide 2.

As shown in FIG. 4, the slide 2 includes a depression 23 formed in the other side of the front portion for engaging with a panel 27 which includes two screw holes 28 for engaging with the fasteners 29 and for allowing the fasteners 29 to solidly secure the cutting blade 3 to the slide 2 and for allowing the cutting blade 3 and the slide 2 to be moved in concert with each other and for allowing the cutting blade 3 to be moved toward the fixed jaw 112 (FIG. 2) by the hand grip 13 in order to conduct the pipe cutting operations.

Referring again to FIG. 1, the fasteners 29 may be engaged into the housing 1 via the openings 14 such that the cutting blade 3 may be disengaged from the slide 2 for replacing a brand new cutting blade without disassembling the whole housing 1. It is to be noted that the front portion of the cutting blade 3 is preferably partially moved outward of the housing 1 when the fasteners 29 are aligned with the opening 14, such that the cutting blade 3 may be easily removed out of the housing 1 when the fasteners 29 are disengaged from the slide 2 and the cutting blade 3. When the fasteners 29 are disengaged from the slide 2 and the cutting blade 3, the panel 27 may be retained in the depression 23 of the slide 2 and the retaining plate 24 may be retained in place by the housing 1 and by the engagement of the dovetail 26 of the retaining plate 24 and the dovetail slot 22 of the slide 2, in order to maintain the alignment of the orifices 21 and the screw holes 28 and the apertures 32 and the punctures 25.

Accordingly, the pipe cutter in accordance with the present invention includes one or more opening 14 formed in the housing for engaging with one or more fasteners and for allowing the fasteners to be engaged into the housing to secure the cutting blade to the slide without disassembling the whole housing.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pipe cutter comprising:

a housing including a rear portion having a handle extended downward, and including a front portion having a fixed jaw, said housing including at least one opening, a hand grip including an upper portion pivotally coupled to said housing at a pivot shaft, a slide slidably engaged in said housing and adapted to be moved forward and rearward, a cutting blade for securing to said slide and for being moved in concert with said slide, an actuating means coupled between said slide and said hand grip for allowing said hand grip to move said slide and said cutting blade forward toward said fixed jaw, and at least one fastener adapted to be engaged into said housing via said at least one opening for allowing said at least one fastener to secure said cutting blade and said slide together without disassembling said housing, said slide including a front portion, said cutting blade including a rear portion for engaging with said front portion of said slide, said slide further including a retaining plate for engaging with said cutting blade and for retaining said cutting blade in place.

2. A pipe cutter according to claim 1, wherein said front portion of said slide includes a recess for receiving said rear portion of said cutting blade.

3. A pipe cutter according to claim 1, wherein said slide includes a dovetail slot formed in said front portion, said retaining plate includes a dovetail for engaging with said dovetail slot and for securing said retaining plate to said slide.

4. A pipe cutter according to claim 1, wherein said rear portion of said cutting blade includes at least one aperture for engaging with said at least one fastener, said front portion of said slide includes at least one orifice for engaging with said at least one fastener, said retaining plate includes at least one puncture for engaging with said at least one fastener and for allowing said at least one fastener to secure said retaining plate and said cutting blade and said slide together.

5. A pipe cutter according to claim 4, wherein said slide includes a side portion having a depression, and includes a panel engaged in said depression, said panel includes at least one hole for engaging with said at least one fastener.

\* \* \* \* \*